United States Patent
Spyker (10) Patent No.: US 10,831,528 B2
(45) Date of Patent: *Nov. 10, 2020

(54) REPLICATION OF BATCH JOBS OF COMPUTING SYSTEMS

(71) Applicant: International Business Machines Corporation, Armonk, NY (US)

(72) Inventor: James D. Spyker, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 747 days.

This patent is subject to a terminal disclaimer.

(21) Appl. No.: 14/134,002

(22) Filed: Dec. 19, 2013

(65) Prior Publication Data

US 2015/0178121 A1 Jun. 25, 2015

(51) Int. Cl.
*G06F 9/46* (2006.01)
*G06F 16/27* (2019.01)

(52) U.S. Cl.
CPC .............. *G06F 9/466* (2013.01); *G06F 16/27* (2019.01)

(58) Field of Classification Search
CPC ..... G06F 17/30575; G06F 9/466; G06F 16/27
See application file for complete search history.

(56) References Cited

U.S. PATENT DOCUMENTS

| | | | |
|---|---|---|---|
| 5,848,405 A * | 12/1998 | Norcott | G06F 16/284 |
| 6,438,538 B1 * | 8/2002 | Goldring | G06F 17/30463 |
| 6,622,152 B1 * | 9/2003 | Sinn | G06F 11/2074 |
| | | | 707/637 |
| 7,321,904 B2 | 1/2008 | Holenstein et al. | |
| 7,555,493 B2 | 6/2009 | Khayter et al. | |
| 8,341,134 B2 | 12/2012 | Bourbonnais et al. | |
| 2003/0220935 A1 | 11/2003 | Vivian et al. | |
| 2005/0183041 A1 | 8/2005 | Chiu et al. | |
| 2009/0216809 A1 * | 8/2009 | Horii | G06F 16/24534 |
| 2010/0030730 A1 * | 2/2010 | Shang | G06F 17/30575 |
| | | | 707/637 |
| 2011/0029569 A1 * | 2/2011 | Ganesh | G06F 17/30595 |
| | | | 707/796 |

(Continued)

FOREIGN PATENT DOCUMENTS

| | | |
|---|---|---|
| CN | 101176090 A | 5/2008 |
| CN | 102214205 A | 10/2011 |

(Continued)

OTHER PUBLICATIONS

Ebbers et al., CoLocating Transactional and Data Warehouse Workloads on System z, IBM Redbooks, 2010.*

(Continued)

*Primary Examiner* — Jensen Hu
(74) *Attorney, Agent, or Firm* — Ewa M. Wozniak (57) ABSTRACT

A method for replicating the effect of batch jobs using a replication agent is provided. The method comprises a replicating agent maintaining a maximum level in rows and a minimum level in rows for one or more columns in a database table of one or more database systems. The replicating agent further analyzes a mapping defined in the replicating agent to identify source columns of a source database system of the one or more database systems which are mapped to a target column of a target database system of the one or more database systems. According to at least one embodiment, the replicating agent further identifies a logical clause of the source database system and the target database system to define a range refresh. The replication agent further initiates the defined range refresh.

7 Claims, 3 Drawing Sheets

(56) References Cited

U.S. PATENT DOCUMENTS

| | | |
|---|---|---|
| 2011/0153568 A1 | 6/2011 | Shang et al. |
| 2011/0251997 A1 | 10/2011 | Wang et al. |
| 2011/0282836 A1* | 11/2011 | Erickson ............... G06F 16/27 707/622 |
| 2012/0150829 A1 | 6/2012 | Bourbonnais et al. |
| 2012/0191680 A1 | 7/2012 | Bourbonnais et al. |
| 2014/0156636 A1* | 6/2014 | Bellamkonda .... G06F 16/24556 707/718 |
| 2015/0032695 A1* | 1/2015 | Tran .................... G06F 16/273 707/625 |
| 2015/0088824 A1* | 3/2015 | Kamp .................... G06F 15/78 707/626 |
| 2015/0178363 A1 | 6/2015 | Spyker |
| 2018/0096044 A1* | 4/2018 | Koza .................... G06F 16/27 |

FOREIGN PATENT DOCUMENTS

| | | |
|---|---|---|
| CN | 104731641 A | 6/2015 |
| WO | 2006101633 A2 | 9/2006 |

OTHER PUBLICATIONS

SQL Server Central, Forum post, Jul. 20, 2009.*

Managing a Logical Standby Database; Source: Oracle Data Guard Concepts and Administration 11g Release 2 (11.2), retrieved May 21, 2013 <http://docs.oracle.com/cd/E11882_01/server.112/e10700/manage_ls.htm>.

Sybase Inc., Replication Server, Administration Guide: vol. 2, Copyright Mar. 2010, Dublin, CA; <http://infocenter.sybase.com/help/topic/com.sybase.infocenter.dc3251>.

* cited by examiner

REPLICATION OF BATCH JOBS OF COMPUTING SYSTEMS

FIELD OF THE INVENTION

The present invention relates generally to computing systems, and more particularly to replication of batch jobs of a source computing system and a target computing system.

BACKGROUND

Batch processing or batch jobs involve execution of a series of programs ("jobs") on a computing system. Batch jobs can be executed by computing systems without manual intervention of a systems administrator. Therefore, all input data of the batch job can be preselected through scripts, command-line parameters, or job control language. Further, batch jobs performed against a source database of the computing system can often cause a high volume of row level changes of database tables of the source database. The high volume of row level changes of the database tables can cause significant latency when logical replication processing is performed on the source database.

SUMMARY

In one embodiment, a computer-implemented method for replicating the effect of batch jobs using a replication agent is provided. The computer-implemented method comprises a replicating agent maintaining, by one or more computer processors, a maximum level in rows and a minimum level in rows for one or more columns in a database table of one or more database systems. The computer-implemented method further comprises the replicating agent analyzing, by the one or more processors, a mapping defined in the replicating agent to identify source columns of a source database system of the one or more database systems which are mapped to a target column of a target database system of the one or more database systems. The computer-implemented method further comprises replicating agent identifying, by the one or more processors, a logical clause of the source database system and the target database system to define a range refresh. The computer-implemented method further comprises the replication agent initiating, by the one or more processors, the defined range refresh.

In another embodiment, a computer system for replicating the effect of batch jobs using a replication agent is provided. The computer system comprises one or more processors, one or more computer-readable memories, one or more computer-readable tangible storage devices, and program instructions which are stored on at least one of the one or more storage devices for execution by at least one of the one or more processors via at least one of the one or more memories. The computer system further comprises program instructions to maintain, by a replicating agent, a maximum level in rows and a minimum level in rows for one or more columns in a database table of one or more database systems. The computer system further comprises program instructions to analyze, by the replicating agent, a mapping defined in the replicating agent to identify source columns of a source database system of the one or more database systems which are mapped to a target column of a target database system of the one or more database systems. The computer system further comprises program instructions to identify, by the replicating agent, a logical clause of the source database system and the target database system to define a range refresh. The computer system further comprises program instructions to initiate, by the replicating agent, the defined range refresh.

In yet another embodiment, a computer program product for replicating the effect of batch jobs using a replication agent is provided. The computer program product comprises one or more processors, one or more computer-readable memories, one or more computer-readable tangible storage devices, and program instructions which are stored on at least one of the one or more storage devices for execution by at least one of the one or more processors via at least one of the one or more memories. The computer program product comprises program instructions to maintain, by a replicating agent, a maximum level in rows and a minimum level in rows for one or more columns in a database table of one or more database systems. The computer program product further comprises program instructions to analyze, by the replicating agent, a mapping defined in the replicating agent to identify source columns of a source database system of the one or more database systems which are mapped to a target column of a target database system of the one or more database systems. The computer program product further comprises program instructions to identify, by the replicating agent, a logical clause of the source database system and the target database system to define a range refresh. The computer program product further comprises program instructions to initiate, by the replicating agent, the defined range refresh.

BRIEF DESCRIPTION OF THE SEVERAL VIEWS OF THE DRAWINGS

Novel characteristics of the invention are set forth in the appended claims. The invention will best be understood by reference to the following detailed description of the invention when read in conjunction with the accompanying Figures, wherein like reference numerals indicate like components, and:

DETAILED DESCRIPTION

The present invention comprises an approach for replicating effect of batch jobs of a batch operating system using a logical replication mechanism of a target computing system to perform synchronization of data changes of the batch jobs of a source computing system, in accordance with embodiments of the present invention.

Figure 1:
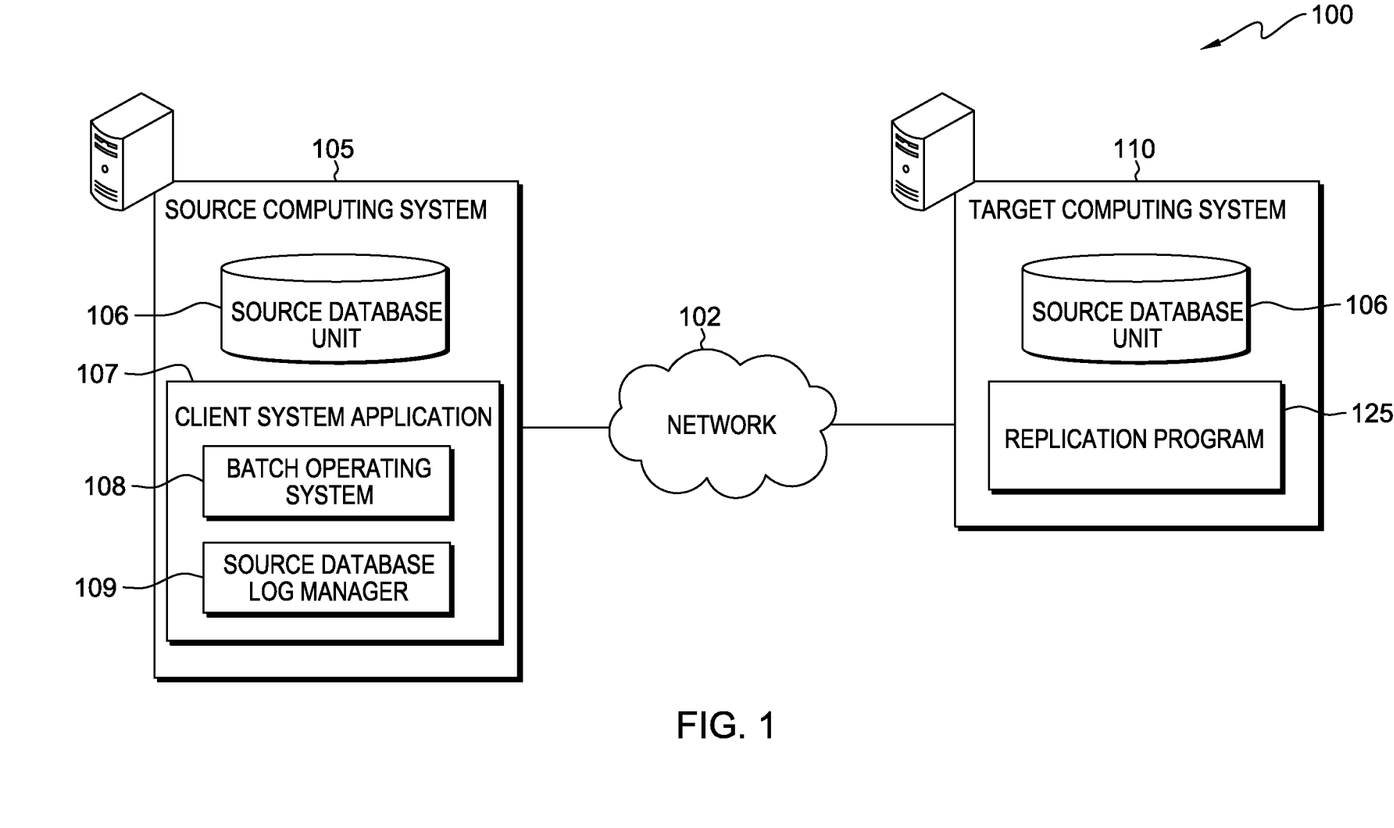
FIG. 1 is a functional system diagram of a batch replication processing system for replicating data that is modified by batch jobs of the batch replication processing system, in accordance with embodiments of the present invention.

The present invention will now be described in detail with reference to the accompanying drawings. Referring to FIG. 1, batch replication processing system 100 for replicating data that is modified by batch jobs of batch replication processing system 100 is shown. Batch replication processing system 100 includes source computing system 105 and target computing system 110, interconnected over network 102.

Network 102 includes one or more network of any kind that can provide communication links between various devices and computers connected together within batch replication processing system 100. Network 102 can also include connections, such as wired communication links, wireless communication links, or fiber optic cables. Network 102 can be implemented as a number of different types of networks, including, for example, a local area network (LAN), a wide area network (WAN) a packet switched telephone network (PSTN), or some other networked system. For example, batch replication processing system 100 can utilize the Internet with network 102 representing a worldwide collection of networks. The term "Internet" as used according to embodiments of the present invention refers to a network or networks that uses certain protocols, such as the TCP/IP protocol, and possibly other protocols, such as the hypertext transfer protocol (HTTP) for hypertext markup language (HTML) documents that make up the World Wide Web (the web).

Source computing system 105 is a server database computing system such as a management server, a web server, or any other electronic device or computing system. The server computing system can also represent a "cloud" of computers interconnected by one or more networks, wherein source computing system 105 can be a primary server for utilizing clustered computers when accessed through a computing environment of batch replication processing system 100. Source computing system 105 includes an original copy of client data of batch replication processing system 100.

Source computing system 105 includes source database unit 106 and client system application 107. Source database unit 106 can be any type of storage device, storage server, storage area network, redundant array of independent discs (RAID), cloud storage device, or any type of data storage. Information stored in source database unit 106 can be structured or unstructured information of database logs, including, a history of actions executed by source computing system 105 to guarantee atomicity, concurrency, isolation, and durability (ACID) properties over crashes or hardware failures of source computing system 105. Source database unit 106 may also act as a system of record of client system application 107. For example, source database unit 106 may be a primary repository of information of client system application 107, or it may be an analytics platform for storing information of client system application 107.

Source database unit 106 can also be a relational database management system (RDBMS). A RDBMS of source database unit 106 is a database that stores information from database logging activities of source computing system 105. A RDBMS can also represent a set of tables made up of columns and rows of source database unit 106. For example, a column of a RDBMS represents a set of values of the same datatype of a database table of the RDBMS. A row of the RDBMS represents a sequence of values such that, for example, a nth value of the row corresponds to the nth column of the database table. Moreover, according to at least one embodiment, each row of the RDBMS is identified by a unique value known as its primary key, in accordance with embodiments of the present invention.

Client system application 107 includes batch operating system 108 and source database log manager 109. Batch operating system 108 executes a series of batch jobs on client system application 107. The batch jobs are a set of executable programs of client system application 107 that are processed in batch mode of source computing system 105. The batch jobs can also represent a sequence of commands that are executed by batch operating system 108, wherein the sequence of commands are listed in a batch file, command file, or shell script of batch operating system 108. According to at least one embodiment of the present invention, source database log manager 109 includes a history of row level changes that occur in source database unit 106. According to at least one embodiment, source database log manager 109 archives database log files of source computing system 105 and retrieves the database log files during recovery of source computing system 105. Source database log manager 109 also supports archiving database log files of source computing system 105, wherein the database log files can be archived to a disk location of source computing system 105.

Target computing system 110 is a server database computing system such as a management server, a web server, or any other electronic device or computing system. The server computing system can also represent a "cloud" of computers interconnected by one or more networks, wherein the target computing system 110 can be a secondary server for utilizing clustered computers when accessed through a computing environment of batch replication processing system 100. Target computing system 110 includes target database unit 115 and replication program 125.

Target database unit 115 can be any type of storage device, storage server, storage area network, redundant array of independent discs (RAID), cloud storage device, or any type of data storage. For example, target database unit 115 is a relational database management system (RDBMS). A RDBMS of target database unit 115 is a database that stores information from database logging activities of target computing system 110. The RDBMS of target database unit 115 can also represent a set of tables made up of columns and rows of target database unit 115. For example, a column of a RDBMS represents a set of values of the same datatype of a database table of the RDBMS. A row of the RDBMS represents a sequence of values such that, for example, a nth value of the row corresponds to the nth column of the database table. Moreover, each row of the RDBMS is identified by a unique value known as its primary key of target computing system 110, as described below, in accordance with embodiments of the present invention.

According to at least one embodiment, target database unit 115 contains a derivative copy of stored data of client system application 107 of source computing system 105. For example, the derivative copy of data of client system application 107 is maintained by replication program 125 for replicating the effect of batch jobs of source computing system 105. Replication program 125 utilizes the derivative copy of data of client system application 107 to perform synchronization of data changes of the batch jobs of batch replication processing system 100 between source computing system 105 and target computing system 110. For example, during execution of batch operating system 108, a batch job can change or rearrange rows of database tables of source computing system 105 in a small number of large transactions.

Replication program 125 identifies large transactions of batch operating system 108 based on knowledge of the size of the large transactions. According to at least one embodiment, grouping of transactions of the batch job of batch operating system 108 can be identified by replication program 125 as a batch job that changes or rearranges rows of database tables of source computing system 105 in the small number of large transactions of the batch job. In some instances, for example, if sequences of batch jobs are executed on source computing system 105, or if more than one batch job is executed concurrently, replication program 125 can group the one batch job that is executed concurrently and consider them as one batch job.

According to at least one embodiment, after a batch job is identified, replication program 125 analyzes the batch job to maintain a maximum level in rows and a minimum level in rows for one or more columns in a database table of source computing system 105 and target computing system 110 that is changed by the batch job of batch operating system 108. Replication program 125 separately maintains the maximum level in rows and the minimum level in rows changed by the batch job of batch operating system 108 for each one of the one or more columns in the database table of source computing system 105 and target computing system 110. For example, in at least one embodiment, the maximum level in rows and the minimum level in rows indicate, respectively, the largest and smallest value seen in a series of the rows of the columns in the database table that is changed by the batch job. Moreover, the one or more columns in the database table can be orderable columns. An orderable column is a database column that can be used in a logical WHERE clause for column mapping of source columns in a database table of source computing system 105 and column mapping of target columns of a database table of target computing system 110, wherein the logical WHERE clause includes logical less than or greater than operators.

Figure 2:
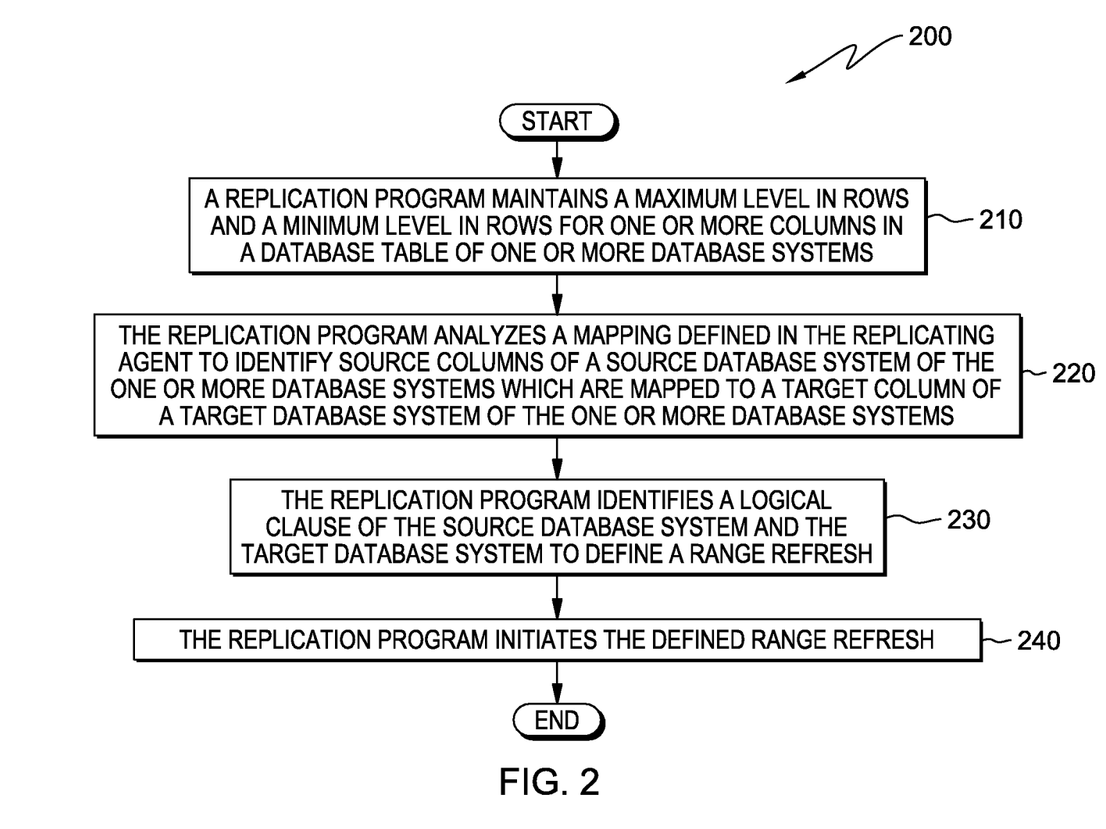
FIG. 2 is a flow diagram depicting steps performed by a replication program for replicating effect of batch jobs of a batch operating system between a source computing system and a target computing system, in accordance with embodiments of the present invention.

FIG. 2 is a flow diagram 200 depicting steps performed by replication program 125 for replicating effect of batch jobs of batch operating system 108 using a logical replication mechanism of replication program 125 to perform synchronization of data changes of the batch jobs of batch replication processing system 100 between source computing system 105 and target computing system 110, in accordance with embodiments of the present invention.

According to at least one embodiment, replication program 125 maintains a maximum level in rows and a minimum level in rows for one or more columns in a database table of source computing system 105 and target computing system 110 that is changed by a batch job of batch operating system 108 of source computing system 105 (Step 210). According to at least one embodiment, the one or more columns in the database table can be orderable columns. For example, an orderable column is a database column that can be used in a logical WHERE clause for column mapping of source columns in a database table of source computing system 105 and column mapping of target columns of a database table of target computing system 110, wherein the logical WHERE clause includes logical less than or greater than operators.

An orderably mapped column of the source column and the target column is a column mapping where both the source columns and the target columns are orderable. Moreover, mapping of the source column and the target column allows a WHERE clause specified against source computing system 105 to be accurately translated into the WHERE clause against target computing system 110, as described in further details below.

According to embodiments of the present invention, replication program 125 separately maintains the maximum level in rows and the minimum level in rows changed by the batch job of batch operating system 108 for each one of the one or more columns in the database table of source computing system 105 and target computing system 110. For example, in at least one embodiment, the maximum level in rows and the minimum level in rows indicate, respectively, the largest and smallest value seen in a series of the rows of the columns in the database table that is changed by the batch job. Moreover, all values of the series of the rows are less than or equal to maximum levels in rows, or greater than or equal to the minimum level in rows. Moreover, levels in rows of the columns of the database table are measured by replication program 125 and maintained by replication program 125 in target database unit 115. For example, replication program 125 further utilizes the maintained measured levels of rows to compare new values of the levels of rows for identifying maximum levels in rows and the minimum levels in rows. For example, if the new value of row levels is higher than the existing maximum levels in rows, the new value will be the new maximum level in rows, and similarly, if the new value of levels in rows is lower than the existing minimum levels in rows, then the new value will be the new minimum level in row.

Replication program 125 analyzes a mapping defined in replication program 125 to identify source columns of source computing system 105 which are orderably mapped to a target column of target computing system 110 (Step 220). According to at least one embodiment of the present invention, replication program 125 determines translation of a WHERE clause from a source column of source computing system 105 to an equivalent WHERE clause of a target column of target computing system 110. Specifically, as described, an orderably mapped column of a source column of source computing system 105 and the target column of target computing system 110 is a column mapping where both the source columns and the target columns are orderable. Moreover, mapping of the source column and the target column allows a WHERE clause specified against source computing system 105 to be accurately translated into the WHERE clause against target computing system 110.

The following are examples of orderable mappings of source columns of source computing system 105 and target columns of target computing system 110:

1. Both source column of source computing system 105 and target column of target computing system 110 are strings and no transformation is performed on the strings by replication program 125;
2. Both source column of source computing system 105 and target columns of target computing system 110 are integers, for example, target column=source column+7; and
3. Both source column and target columns are strings, with the target column having a fixed prefix of "EAST", wherein the WHERE clause against the target column relies on the SUBSTRING function to ignore the prefix of "EAST".

The following are examples of un-orderable mappings of source columns of source computing system 105 and target columns of target computing system 110:

1. Target column is a concatenation of two source columns of source computing system 105; and
2. Target column is a truncation of a single source string column of target computing system 110.

Replication program 125 identifies a logical clause of source computing system 105 and target computing system 110 to define a range refresh (Step 230). The range refresh includes all rows of both source computing system 105 and target computing system 110 that are affected by batch job of batch operating system 108. For example, the range refresh is a standard logical replication procedure, wherein an identified range of data is refreshed from source computing system 105 to target computing system 110 utilizing bulk load facilities of the source computing system 105. The range refresh is identified by a logical WHERE clause for both source computing system 105 and target computing system 110. According to aspects of the present invention, the logical clause is a WHERE clause that is identified for each of source computing system 105 and target computing system 110 to define the range refresh. The logical WHERE clause includes all of the orderably mapped columns. For each orderably mapped column, a source WHERE clause of source computing system 105 ensures that any matching values are greater than or equal to the maximum level in rows and less than or equal to the maximum level in rows.

According to at least one embodiment, a range refresh is performed by replication program 125 to identify a range of data that is refreshed from a source database unit 106 of source computing system 105 to a target database unit 115. For example, the range of data must be identified by a WHERE clause for both source computing system 105 and target computing system 110. The WHERE clause for target computing system 110 is used to refresh sections of database tables of target computing system 110. Moreover, the WHERE clause of source computing system 105 can be translated to the corresponding WHERE clause of target computing system 110, wherein the range refresh is performed by replication program 125.

For example, according to aspects of the present invention, the primary key of a source computing system 105 and target computing system 110 are identified by replication program 125 in database tables of source computing system 105 or target computing system 110. A primary key of source computing system 105 is mapped to target computing system 110 with no transformations and is the only orderably mapped column. Replication program 125 initiates the range refresh (Step 240). According to at least one embodiment, the initiated defined refresh range includes a cleanup of target computing system 110. Execution of range refresh by replication program 125 first deletes all the rows from the database tables of target computing system 110 that matches the WHERE clauses of target computing system 110. Replication program 125 then utilizes the WHERE clause to retrieve the matching rows from database tables of source computing system 105. For example, each of the matching rows of source computing system 105 is transformed and applied to a database table of target computing system 110. Thereafter, the database tables of source computing system 105 and database tables of target computing system 100 will have synchronized content for all the rows that match the WHERE clauses of batch replication processing environment 100.

Replication program 125 further examines all operations between source computing system 105 and target computing system 110 to determine if they are either:

All deletes; and

All updates setting the same column to the same value. Examination of operations of source computing system 105 and target computing system 110 enables replication program 125 to identify likely situations for very common batch jobs or operations between source computing system 105 and target computing system 110:

DELETE FROM TABLE1 WHERE . . . .

UPDATE TABLE1 SET STATE='somevalue' WHERE . . . .

For example, if one of the above-referenced situations of batch jobs or operations occur between source computing system 105 and target computing system 110, then a WHERE clause can be generated by replication program 125 to determine if row counts of source computing system 105 match the number of operations found in the batch jobs for a table of source computing system 105. If the row count matches the number of operations found in the batch for the table, replication program 125 directly executes an equivalent statement of the referenced situations of the batch jobs for target computing system 110.

Figure 3:
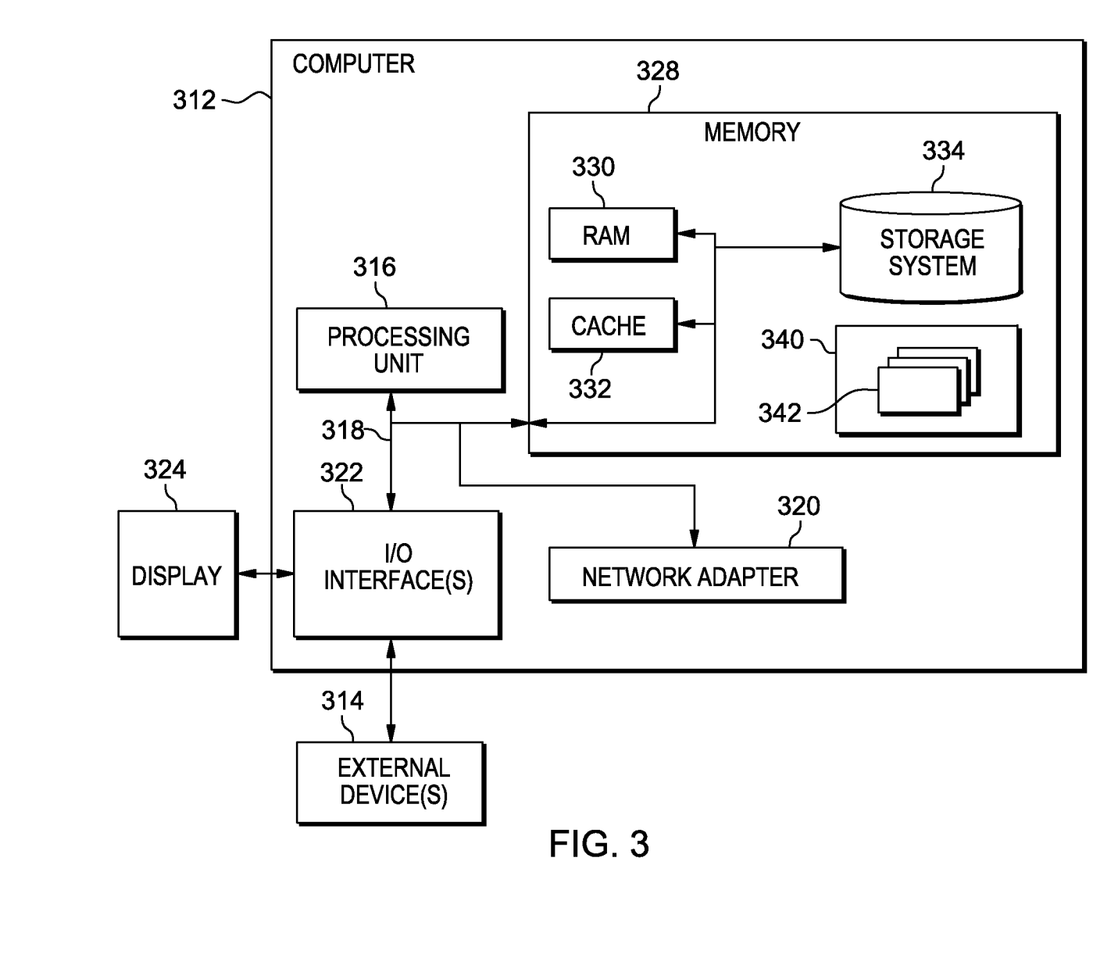
FIG. 3 illustrates a block diagram of components of a computer system in accordance with embodiments of the present invention.

FIG. 3 is a block diagram of a computer system, in accordance with an embodiment of the present invention. Computer system 300 is only one example of a suitable computer system and is not intended to suggest any limitation as to the scope of use or functionality of embodiments of the invention described herein. Regardless, computer system 300 is capable of being implemented and/or performing any of the functionality set forth hereinabove. In computer system 300 there is computer 312, which is operational with numerous other general purpose or special purpose computing system environments or configurations. Examples of well-known computing systems, environments, and/or configurations that may be suitable for use with computer 312 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Source computing system 105 and target computing system 110 can be implemented as an instance of computer 312.

Computer 312 may be described in the general context of computer system executable instructions, such as program modules, being executed by a computer system. Generally, program modules may include routines, programs, objects, components, logic, data structures, and so on that perform particular tasks or implement particular abstract data types. Computer 312 may be practiced in distributed cloud computing environments where tasks are performed by remote processing devices that are linked through a communications network. In a distributed cloud computing environment, program modules may be located in both local and remote computer system storage media including memory storage devices.

As further shown in FIG. 3, computer 312 is shown in the form of a general-purpose computing device. The components of computer 312 may include, but are not limited to, one or more processors or processing units 316, memory 328, and bus 318 that couples various system components including memory 328 to processing unit 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 312 typically includes a variety of computer system readable media. Such media may be any available media that is accessible by computer 312, and includes both volatile and non-volatile media, and removable and non-removable media.

Memory 328 includes computer system readable media in the form of volatile memory, such as random access memory (RAM) 330 and/or cache 332. Computer 312 may further include other removable/non-removable, volatile/non-volatile computer system storage media. By way of example only, storage system 334 can be provided for reading from and writing to a non-removable, non-volatile magnetic media (not shown and typically called a "hard drive").

Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the invention.

Client system application 107, batch operating system 108, and replication program 125 can be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein. Client system application 107 and replication program 125 can be implemented as an instance of program 340.

Computer 312 may also communicate with one or more external device(s) 314 such as a keyboard, a pointing device, etc., as well as display 324; one or more devices that enable a user to interact with computer 312; and/or any devices (e.g., network card, modem, etc.) that enable computer 312 to communicate with one or more other computing devices. Such communication occurs via Input/Output (I/O) interface(s) 322. Still yet, computer 312 communicates with one or more networks such as a local area network (LAN), a general wide area network (WAN), and/or a public network (e.g., the Internet) via network adapter 320. As depicted, network adapter 320 communicates with the other components of computer 312 via bus 318. It should be understood that although not shown, other hardware and/or software components could be used in conjunction with computer 312. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustrations are implemented by special purpose hardware-based systems that perform the specified functions or acts, or combinations of special purpose hardware and computer instructions.

As will be appreciated by one skilled in the art, embodiments of the present invention may be embodied as a system, method, or computer program product. Accordingly, embodiments of the present invention may take the form of an entirely hardware embodiment, an entirely software embodiment (including firmware, resident software, microcode, etc.), or an embodiment combining software and hardware aspects that may all generally be referred to herein as a "circuit", "module" or "system". Furthermore, embodiments of the present invention may take the form of a computer program product embodied in one or more computer-readable medium(s) having computer-readable program code embodied thereon.

In addition, any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that contains or stores a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that communicates, propagates, or transports a program for use by or in connection with an instruction execution system, apparatus, or device.

Program code embodied on a computer-readable medium may be transmitted using any appropriate medium, including, but not limited to, wireless, wireline, optical fiber cable, RF, etc., or any suitable combination of the foregoing. Computer program code for carrying out operations for embodiments of the present invention may be written in any combination of one or more programming languages, including an object-oriented programming language such as Java, Smalltalk, C++ or the like, conventional procedural programming languages such as the "C" programming language, a hardware description language such as Verilog, or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Based on the foregoing method for replicating the effect of batch jobs using a replication agent in a batch replication processing system have been disclosed. However, numerous modifications and substitutions can be made without deviating from the scope of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. Therefore, the present invention has been disclosed by way of example and not limitation.

What is claimed is:

1. A computer-implemented method for replicating the effect of batch jobs, the method comprising operations performed by one or more computer processors, the operations comprising:
    identifying a batch job, wherein the batch job comprises a plurality of changes to a source database table of one or more database systems;
    identifying a maximum level in rows and a minimum level in rows for each of one or more columns in the source database table that are changed by the batch job and that are orderable columns of the source database table, wherein the maximum level in rows indicates a largest value in a series of the rows of the column in the source database table and the minimum level in rows indicates a smallest value in a series of the rows of the column in the source database table;
    analyzing a mapping from the source database table to a target database table according to the batch job to identify source columns of the source database table that are mapped to a target column of the target database table;
    examining the plurality of changes to the source database table to determine if the changes are of same type, wherein the changes are of the same type when the batch jobs are all deletes or all updates setting a corresponding column of the target database table to the same value;
    in response to determining the changes are of the same type, generating a logical clause to determine if row counts of the source computing system match the number of operations found in the batch jobs for a table of source computing system;
    generating the logical clause of the source database system that includes a range of data to be refreshed, wherein the range of data to be refreshed is defined according to the identified maximum level in rows and minimum level in rows of the source database table; and
    refreshing the data in the range of data in the target database table, thereby replicating the data of the source database in the target database in a manner that reduces latency of replication.

2. The computer-implemented method according to claim 1, wherein the logical clause is a WHERE clause, and wherein the WHERE clause includes logical operators.

3. The computer-implemented method according to claim 1, further comprising:
    determining a translation of the logical WHERE clause of the source database table to a logical WHERE clause of the target database table.

4. The computer-implemented method according to claim 1, wherein the analyzing of the mapping from the source database table to the target database table includes identifying columns of the target database table that are orderable.

5. The computer-implemented method according to claim 1, wherein the refreshing the data in with the range of data includes a cleanup of a target database system.

6. The computer-implemented method according to claim 1, further comprising:
    executing an equivalent statement of the reference situation of the batch jobs for target computing system, when the row count matches the number of operations found in the batch for the table of the source computing system.

7. The computer-implemented method according to claim 1, wherein the refreshing the data in the range of data in the target database table further comprises:
    refreshing the data using a range refresh logical operator that includes the logical clause including the range of data to be refreshed.

* * * * *